United States Patent [19]

Reinert

[11] 4,303,575

[45] Dec. 1, 1981

[54] FLAME RETARDANT POLYCARBONATE COMPOSITIONS

[75] Inventor: Gerard E. Reinert, McMurray, Pa.

[73] Assignee: Mobay Chemical Corporation, Pittsburgh, Pa.

[21] Appl. No.: 119,248

[22] Filed: Feb. 7, 1980

[51] Int. Cl.³ .................... C08K 5/09; C08K 5/42
[52] U.S. Cl. .................... 260/45.8 A; 260/37 PC; 260/45.7 S; 260/45.95 G
[58] Field of Search ............ 260/45.7 SF, 45.8 A, 260/45.8 AV

[56] References Cited

U.S. PATENT DOCUMENTS

| | | | |
|---|---|---|---|
| 3,398,212 | 8/1968 | Jackson, Jr. et al. | 260/45.95 R |
| 3,470,116 | 9/1969 | Praetzel et al. | 260/45.7 RL |
| 3,535,300 | 10/1970 | Gable | 260/45.7 RL |
| 3,631,132 | 12/1971 | Westernacher et al. | 521/907 |
| 3,751,396 | 8/1973 | Gall | 260/40 R |
| 3,775,367 | 11/1973 | Nouvertne | 260/45.7 SF |
| 3,904,707 | 9/1975 | Gebhart et al. | 260/45.7 R |
| 3,951,903 | 4/1976 | Shaffer | 260/37 PC |
| 4,070,315 | 1/1978 | Mehta et al. | 260/45.8 A |
| 4,174,359 | 11/1979 | Sivaramakrishnan et al. | 528/198 |
| 4,208,489 | 6/1980 | Schmidt et al. | 525/146 |
| 4,223,100 | 9/1980 | Reinert | 525/146 |

FOREIGN PATENT DOCUMENTS 1273071 5/1972 United Kingdom.

Primary Examiner—Lorenzo B. Hayes
Assistant Examiner—R. A. White
Attorney, Agent, or Firm—Gene Harsh; Lawrence S. Pope; Aron Preis

[57] ABSTRACT

A flame retardant polycarbonate composition is comprised of a polycarbonate resin, perfluoroalkane sulfonate salt and a halogenated aromatic anhydride.

11 Claims, No Drawings

FLAME RETARDANT POLYCARBONATE COMPOSITIONS

BACKGROUND OF THE INVENTION

1. Field of the Invention

This invention relates to polycarbonates and more particularly to flame retardant polycarbonates having a perfluoroalkane sulfonate salt incorporated therein along with a halogenated aromatic anhydride.

2. Description of the Prior Art

Polycarbonates derived from reactions involving organic dihydroxy compounds and carbonic acid derivatives have found extensive commercial application because of their excellent mechanical and physical properties. These thermoplastic polymers are particularly suited for the manufacture of molded products requiring impact strength, rigidity, toughness, thermal and dimensional stability as well as excellent electrical properties.

In certain end use applications, the polycarbonate article is required to meet certain flammability requirements. In order to achieve a particular flame retardancy requirement, additives are well known which reduce or extinguish the flame spread of a normally flammable or fire retardant polycarbonate resin. Even though flame spread may be eliminated, when the polycarbonate is contacted with flame, the heat causes it to drip and the molten and sometimes flaming polymer may drip onto flammable materials and ignite them.

It has been recognized that perfluoroalkane sulfonates impart improved flame resistance to polycarbonates in which they are incorporated. Exemplary of this recognition is U.S. Pat. No. 3,775,367.

Although these perfluorinated alkali metal or ammonium sulfonates provide improved flame retardancy, they do not necessarily provide sufficient drip suppression.

In accordance with the present invention a polycarbonate is provided which imparts flame retardancy or self-extinguishing characteristics and suppressed dripping during flaming.

BRIEF DESCRIPTION OF THE INVENTION

A flame retardant polycarbonate composition is comprised of a polycarbonate resin, a perfluoroalkane sulfonate salt and a halogenated aromatic anhydride.

DETAILED DESCRIPTION OF THE INVENTION

When used herein, "polycarbonate resin" means the neat resin without additives; "polycarbonate" means both the formulated polycarbonate resin with additives therein and also the final molded plastic product.

The polycarbonate resins useful in practice of the invention are produced by reacting phenolic dihydroxy compounds such as di-(monohydroxyaryl)-alkanes or dihydroxybenzenes and substituted dihydroxybenzenes with derivatives of the carbonic acids such as carbonic acid diesters, phosgene, bis-chloro-carbonic acid esters of di-(monohydroxyaryl)-alkanes and the bis-chlorocarbonic acid esters of the dihydroxybenzenes and the substituted dihydroxybenzenes.

The two aryl residues of the di-(monohydroxyaryl)-alkanes applied according to the invention can be alike or different. The aryl residues can also carry substituents which are not capable of reacting in the conversion into polycarbonates, such as halogen atoms or alkyl groups, for example, the methyl, ethyl, propyl or tert-butyl groups. The alkyl residue of the di-(monohydroxyaryl)-alkanes linking the two benzene rings can be an open chain or a cycloaliphatic ring and may be substituted, if desired, for example by an aryl residue.

Suitable di-(monohydroxyaryl)-alkanes are for example (4,4'-dihydroxy-diphenyl)-methane, 2,2'-(4,4'-dihydroxy-diphenyl)-propane, 1,1-(4,4'-dihydroxydiphenyl)-cyclohexane, 1,1-(4,4'-dihydroxy-3,3'-dimethyl-diphenyl)-cyclohexane, 1,1-(2,2'-dihydroxy-4,4'-dimethyl-diphenyl)-butane, 2,2(2,2'-dihydroxy-4,4'-ditert.-butyl-diphenyl)-propane or 1,1'-(4,4'-dihydroxy-diphenyl)-1-phenyl-ethane, furthermore methane derivatives which carry besides two hydroxyaryl groups an alkyl residue with at least two carbon atoms and a second alkyl residue with one or more carbon atoms, such as 2,2-(4,4'-dihydroxy-diphenyl)-butane, 2,2-(4,4'-dihydroxy-diphenyl)-pentane (melting point 149°–150° C.), 3,3-(4,4'-dihydroxy-diphenyl)-pentane, 2,2-(4,4'-dihydroxy-diphenyl)-hexane, 3,3-(4,4'-dihydroxydiphenyl)-hexane, 2,2-(4,4'-dihydroxy-diphenyl)-4-methyl-pentane, 2,2-(4,4'-dihydroxy-diphenyl)-heptane, 4,4-(4,4'-dihydroxy-diphenyl)-heptane (melting point 148°–149° C.) or 2,2-(4,4'-dihydroxy-diphenyl)-tri-decane. Suitable di-(monohydroxyaryl)-alkanes, the two aryl residues of which are different, are, for example, 2,2-(4,4'-dihydroxy-3'-methyl-diphenyl)-propane and 2,2-(4,4'-dihydroxy-3-methyl-3'-isopropyl-diphenyl)-butane.

Suitable di-(monohydroxyaryl)-alkanes, the aryl residues of which carry halogen atoms are for instance 2,2-(3,5,3',5'-tetra-chloro-4,4'-dihydroxy-diphenyl)-propane, 2,2-(3,5,3',5'-tetrabromo-4,4'-dihydroxy-diphenyl)-propane, (3,3'-dichloro-4,4'-dihydroxy-diphenyl)-methane and 2,2'-dihydroxy-5,5'-difluoro-diphenyl-methane. Suitable di-(monohydroxyaryl)-alkanes, the alkyl residue of which, linking the two benzene rings, is substituted by an aryl residue are for instance (4,4'-dihydroxy-diphenyl)-phenyl-methane and 1,1-(4,4'-dihydroxy-diphenyl)-1-phenyl-ethane.

Suitable dihydroxybenzenes and substituted dihydroxybenzenes are hydroquinone, resorcinol, pyrocatecol, methyl hydroquinone and the like. Other suitable dihydroxyaromatic compounds are 4,4'-dihydroxydiphenylene, 2,2'-dihydroxy-diphenylene, dihydroxynaphthalene, dihydroxyanthracene and compounds represented by the structural formula:

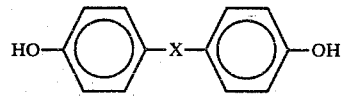

wherein X is S,

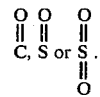

Small amounts of trifunctional or more than trifunctional hydroxy compounds may be reacted in the formation of the polycarbonate resins to branch the polymer chains, preferably of between about 0.05 and 2.0 mol percent (relative to diphenols employed), of trifunctional or more than trifunctional compounds, especially compounds with three or more phenolic hydroxyl groups.

Polycarbonates of this type are described, for example, in German Offenlegungsschriften (German Published Specifications) Nos. 1,570,533; 1,595,762; 2,116,974; and 2,113,347; British Patent Specification 1,079,821 and U.S. Pat. No. 3,544,514 (incorporated herein by reference).

Some examples of compounds with three or more than three phenolic hydroxyl groups which can be used are phloroglucinol; 4,6-dimethyl-2,4,6-tri-(4-hydroxyphenyl)-heptane-2,4,6-dimethyl-2,4,6-tri-(4-hydroxyphenyl)-heptane; 1,4,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis-(4-hydroxyphenyl)-cyclohexyl]-propane; 2,4-bis-(4-hydroxyphenyl-isopropyl)-phenol; 2,6-bis-(2-hydroxy-5'-methylbenzyl)-4-methylphenol; 2-(4-hydroxyphenyl)-2-(2,4-dihydroxyphenyl)-propane; hexa-(4-(4-hydroxyphenylisopropyl) phenyl) ortho-terephthalic acid ester; tetra-(4-hydroxyphenyl)-methane; tetra-(4-(4-hydroxyphenylisopropyl)-phenoxy)-methane; and 1,4-bis-((4',4''-dihydroxytriphenyl)-methyl)-benzene. Some of the other trifunctional compounds are 2,4-dihydroxybenzoic acid, trimesic acid, cyanuric chloride and 3,3-bis-(4-hydroxyphenyl)-2-oxo-2,3-dihydroindole.

In order to obtain special properties, mixtures of various di-(monohydroxyaryl)-alkanes can also be used, thus mixed polycarbonate resins are obtained. By far the most useful polycarbonate resins are those based on 4,4'-dihydroxy-diaryl methanes and more particularly bisphenol A [2,2-(4,4'-dihydroxy-diphenyl)-propane]. Thus, flame retardancy may be imparted to the basic polycarbonate by reacting a mixture of bisphenol A and tetrabromobisphenol A [2,2-(3,5,3',5'-tetrabromo-4,4'-dihydroxy-diphenyl)-propane] with phosgene or a like carbonic acid derivative.

The polycarbonate resins are those having a weight average molecular weight from 10,000 to 200,000 and preferably a melt flow rate range of 1 to 24 g/10 min. (ASTM 1238) and are prepared by methods known to those skilled in the art and more particularly by methods disclosed in U.S. Pat. Nos. 3,028,365; 2,999,846; 3,248,414; 3,153,008; 3,215,668; 3,187,065; 2,964,974; 2,970,137; 2,991,273 and 2,999,835, all incorporated herein by reference.

The perfluoroalkane sulfonate salts useful in the practice of this invention include but are not limited to sodium and potassium perfluorobutane sulfonate, sodium and potassium perfluoromethylbutane sulfonate, sodium and potassium perfluorooctane sulfonate, sodium and potassium perfluoromethane sulfonate, sodium and potassium perfluoroethane sulfonate, sodium and potassium perfluoropropane sulfonate, sodium and potassium perfluorohexane sulfonate, sodium and potassium perfluoroheptane sulfonate, tetraethylammonium perfluorobutane sulfonate, tetraethylammonium perfluoromethylbutane sulfonate and the like and mixtures thereof. Such sulfonates or mixtures thereof may be added to the polycarbonate during its preparation or they may be added to the melt of the finished polycarbonate by homogenization using an extruder, for example, or by any other suitable means which will insure a thorough distribution of the additives of this invention in the polycarbonate resin. Some such suitable methods are described, for example, in U.S. Pat. No. 3,509,091, incorporated herein by reference. These perfluoroalkane sulfonate salts are incorporated into the polycarbonate at a level of 0.01 to 1 percent by weight based on the weight of the polycarbonate resin composition and more preferably at a level of 0.01 to 0.5 percent.

The halogenated aromatic anhydride component useful in the practice of the invention is preferably one having a single aromatic ring with perhalogenation, for example, perhalogenated o-phthalic anhydride. Further, the brominated analog of the phthalic anhydride is particularly useful in the practice of the invention. The halogenated aromatic anhydride is present in the polycarbonate at a level of about 0.05 to about 1 percent by weight based on the total weight of polycarbonate resin and more preferably about 0.1 to 0.75 percent by weight.

In addition to the previously recited constituents, other materials known to those skilled in the art may be used to impart particular properties. For example, pigments or dyes may be added in order to form opaque or colored molded products. In the case of opaque products, titanium dioxide is predominantly used to opacify the polycarbonate to form a white molded product. If a colored product is desired, pigments such as chrome yellows and oranges or chrome greens may be added to provide various colors to the article. Also, oil soluble dyes may be incorporated into the polycarbonate to impart color to the final molded article. In order to color the polycarbonate, minimal amounts of colorant, i.e. 0.01 to 10 grams colorant per pound polycarbonate, are necessary.

The polycarbonate in accordance with the present invention exhibits suppressed molten dripping and the necessary flame retardancy to comply with the UL 94 V-0 requirements. The UL 94 test is conducted as follows:

Test specimens of polycarbonate are molded in bars having dimensions of 12.7 cm × 12.7 mm × 1.6 mm. The panels are mounted vertically so that the bottom of the test specimen is 305 mm above a swatch of surgical cloth. Each test bar is individually ignited for two successive ten-second ignitions and the burning characteristics after each ignition are noted and the sample is rated. A Bunsen burner is used to ignite the sample with a three-quarter inch (10 mm) blue flame from natural gas having approximately 1,000 BTU per cubic foot heat content.

The UL 94 V-0 classification exemplifies the following properties in materials tested in accordance with the UL 94 specification. Polycarbonates within this class have no samples which burn for more than ten seconds after each application of the test flame; do not have a total flaming time of more than 50 seconds for the two flame applications of each set of samples; do not have any specimens which burn completely up to the holding clamp which is positioned at the top of the specimen; do not have any specimens which ignite the cotton which is placed below the sample with flaming drips or particles; and do not have any specimens which glow longer than 30 seconds after removal of the test flame.

Other UL 94 classificationss exemplify samples which are less flame retardant and self-extinguishing and which have flaming drips or particles. These classifications are UL 94 V-1 and V-2. The polycarbonates within the scope of the present invention characteristically demonstrate those properties in the UL 94 V-0 classification.

In addition to the UL 94 flammability test, another test for determination of fire retardancy is the IBM DMH 6-0430-102 flammability test of May 1974, Section 3.5 et seq. According to this test, specimens measuring 120 mm+10 mm+indicated thickness are suspended vertically and exposed to a 20 mm high Bunsen burner flame (without an air supply). The distance of the top of the Bunsen burner is 10 mm from the bottom of the test specimen. The length of time is determined for which a test specimen can be exposed to the flame as described above without continuing to burn for longer than 30 seconds after removal of the flame, and without burning particles dripping off of the specimen and igniting a wad of cotton wool placed under the specimen. A material is classed as a Class A material if, after a 60 second flame application time, the material will extinguish without producing flame droplets within 30 seconds. Class B materials are those that extinguish within 30 seconds after a 5 second or more flame application time but cannot withstand a 60 second flame application time without exceeding the foregoing. Thus, for example, if a material extinguishes within 30 seconds for flame application times up to 45 seconds, it is classified Class B/indicated thickness/45 sec. Essentially then, this flammability test involves rating samples according to ignition time. The higher the ignition time, the more flame retardant is the sample.

The invention will be further illustrated but is not intended to be limited by the following Examples.

EXAMPLES

EXAMPLE 1

A polycarbonate resin based upon the reaction product of bisphenol A, phosgene and 0.2 mol percent based on total diphenol content of 3,3-bis-(4-hydroxyphenyl)-2-oxo-2,3-dihydroindole, and having a melt flow index of 2.1 g/10 min. (ASTM 1238) was tumble blended with 0.5 percent by weight of perfluorobutane potassium sulfonate based on the weight of the polycarbonate resin. The polycarbonate was molded for testing in accordance with the IBM flammability test. The maximum allowable ignition time was 20 seconds.

EXAMPLES 2–18

Example 1 was repeated except that various additives were substituted for and included with the perfluorobutane potassium sulfonate. The test results of these compositions are reported in Tables I and II.

TABLE I

| Example | Composition wt. % Halogen Compound | C$_4$ Salt[1] | 1/16" (0.062") IBM Flammability Test Ign. Time (Seconds) |
|---|---|---|---|
| 1* | — | 0.5 | 20 |
| 2 | 0.5 TCPA[2] | — | 0 |
| 3* | 0.5 TCPA | 0.5 | 60 |
| 4 | 0.5 Firemaster 680[3] | — | 5 |
| 5* | 0.5 Firemaster 680 | 0.5 | 15 |
| 6* | 0.5 DE-83P[4] | 0.5 | 25 |
| 7* | 0.5 TC BPA[5] | 0.5 | 20 |

[1]Perfluorobutane potassium sulfonate
[2]Tetrachlorophthalic anhydride (51.8% Cl)
[3]Brominated aromatic compound (70% Br)
[4]Decabromodiphenyl ether (83% Br)
[5]Tetrachlorobisphenol-A (38.8% Cl)
*UL 94 V-O Rating at 1/16"

TABLE II

| Example | Composition wt. % Halogen Compound | C$_4$ Salt[1] | UL 94 Flammability Rating at 1/16" | IBM Flammability at 1/16"-Ign. Time (Seconds) |
|---|---|---|---|---|
| 8 | — | 0.1 | V-2 | 10 |
| 9 | 0.1 TCPA[2] | — | Fails | 5 |
| 10 | 0.25 TCPA | — | Fails | 0 |
| 11 | 0.1 TCPA | 0.1 | V-O | 20 |
| 12 | 0.25 TCPA | 0.1 | V-O | 20 |
| 13 | 0.1 TCBPA[3] | 0.1 | V-O | 20 |
| 14 | 0.25 TCBPA | 0.1 | V-O | 15 |
| 15 | 0.1 FM 680[4] | — | V-2 | 10 |
| 16 | 0.25 FM 680 | — | V-2 | 5 |
| 17 | 0.1 FM 680 | 0.1 | V-2 | 15 |
| 18 | 0.25 FM 680 | 0.1 | V-2 | 15 |

[1]Perfluorobutane potassium sulfonate
[2]Tetrachlorophthalic anhydride (51.8% Cl)
[3]Tetrachlorobisphenol-A (38.8% Cl)
[4]Firemaster 680 - brominated aromatic compound (70% Br)

Thus, as can be seen from the foregoing Examples, the halogenated aromatic dicarboxylic anhydride is useful in combination with perfluoroalkane sulfonate salts in imparting flame retardancy and flaming drip suppression to polycarbonates.

Having described the invention with reference to specific materials and specific Examples, those of skill in the art can readily select materials and procedures in accordance with the present invention. Thus, the invention is only to be limited so far as is set forth in the accompanying claims.

What is claimed is:

1. In a flame retardant polycarbonate comprised of a polycarbonate resin and a perfluoroalkane sulfonate salt, the improvement comprising an effective amount of a halogenated aromatic carboxylic anhydride to impart improved flame retardancy to said polycarbonate.

2. The polycarbonate of claim 1 or claim 10, wherein said halogenated aromatic anhydride is tetrachlorophthalic anhydride.

3. The polycarbonate of claim 1 or claim 10, wherein said halogenated aromatic anhydride is present at a level of about 0.05 to about 1.0 percent by weight based on the weight of polycarbonate resin.

4. The polycarbonate of claim 2, wherein said halogenated aromatic anhydride is present at a level of 0.1 to 0.75 percent based on the weight of polycarbonate resin.

5. A polycarbonate comprised of:
   (a) 100 parts by weight of a polycarbonate resin;
   (b) 0.01 to 1 part by weight of a perfluoroalkane sulfonate salt; and
   (c) 0.05 to 1 part by weight of a halogenated aromatic carboxylic anhydride.

6. The polycarbonate of claim 5, wherein said perfluoroalkane sulfonate salt is present at a level of 0.01 to 0.5 part by weight.

7. The polycarbonate of claim 5, wherein said perfluoroalkane sulfonate salt is potassium perfluorobutane sulfonate.

8. The polycarbonate of claim 5, wherein said halogenated aromatic anhydride is present at a level of 0.1 to 0.75 part by weight.

9. The polycarbonate of claim 5, wherein said halogenated aromatic anhydride is tetrachlorophthalic anhydride.

10. In a flame retardant polycarbonate comprised of a branched polycarbonate resin and a perfluoroalkane sulfonate salt, the improvement comprising an effective amount of a halogenated aromatic carboxylic anhydride to impart improved flame retardancy to said branched polycarbonate.

11. The polycarbonate of claim 10 wherein said halogenated aromatic anhydride is present at a level of 0.1 to 0.75 percent based on the weight of said branched polycarbonate resin.

* * * * *